March 22, 1966     O. G. NEWMAN     3,241,270
CONVERTIBLE STADIUM

Filed Dec. 3, 1962     10 Sheets-Sheet 1

INVENTOR:
OWEN G. NEWMAN
BY Gravely, Lieder & Woodruff
ATTORNEYS.

March 22, 1966  O. G. NEWMAN  3,241,270
CONVERTIBLE STADIUM
Filed Dec. 3, 1962  10 Sheets-Sheet 2
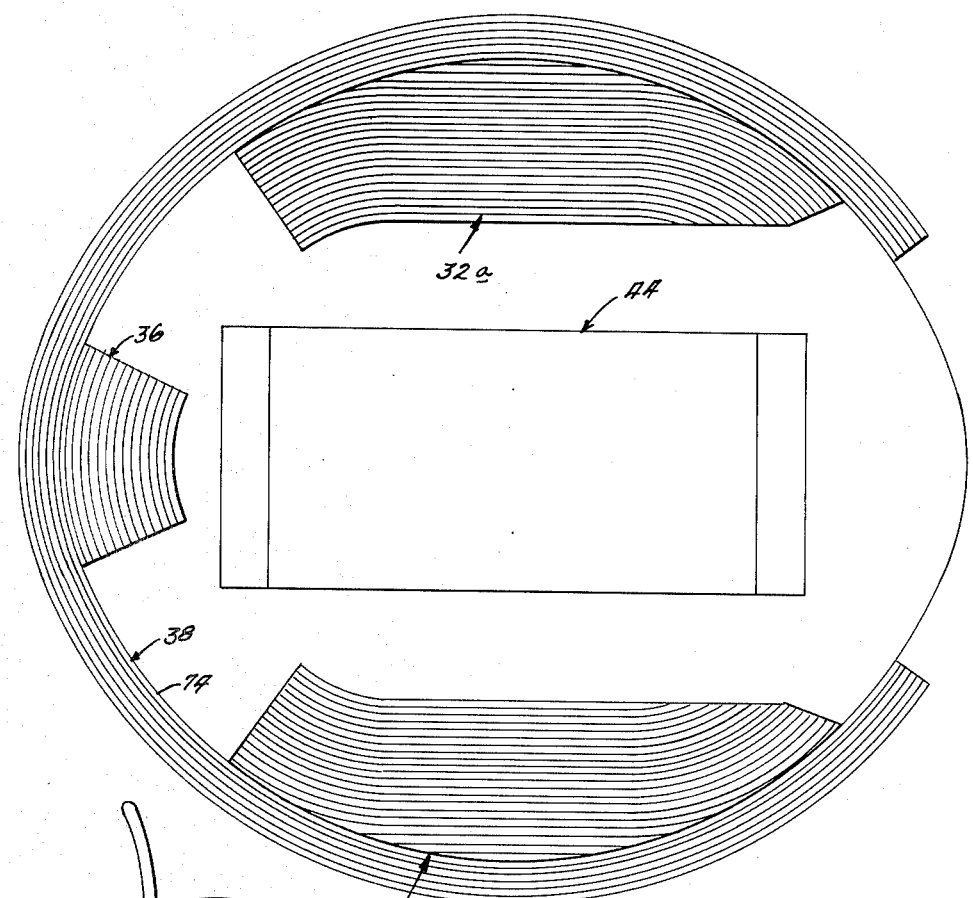
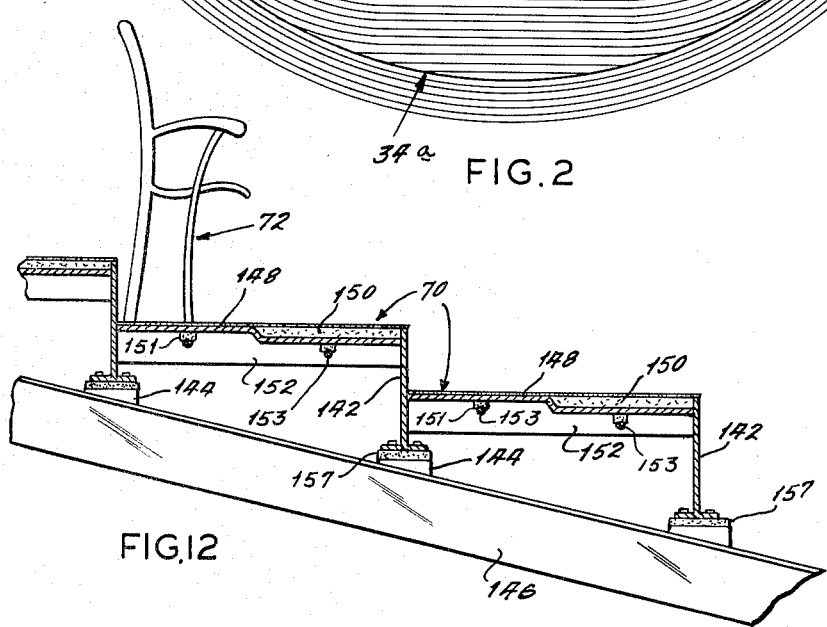
INVENTOR:
OWEN G. NEWMAN
BY
Gravely, Lieder & Woodruff
ATTORNEYS.

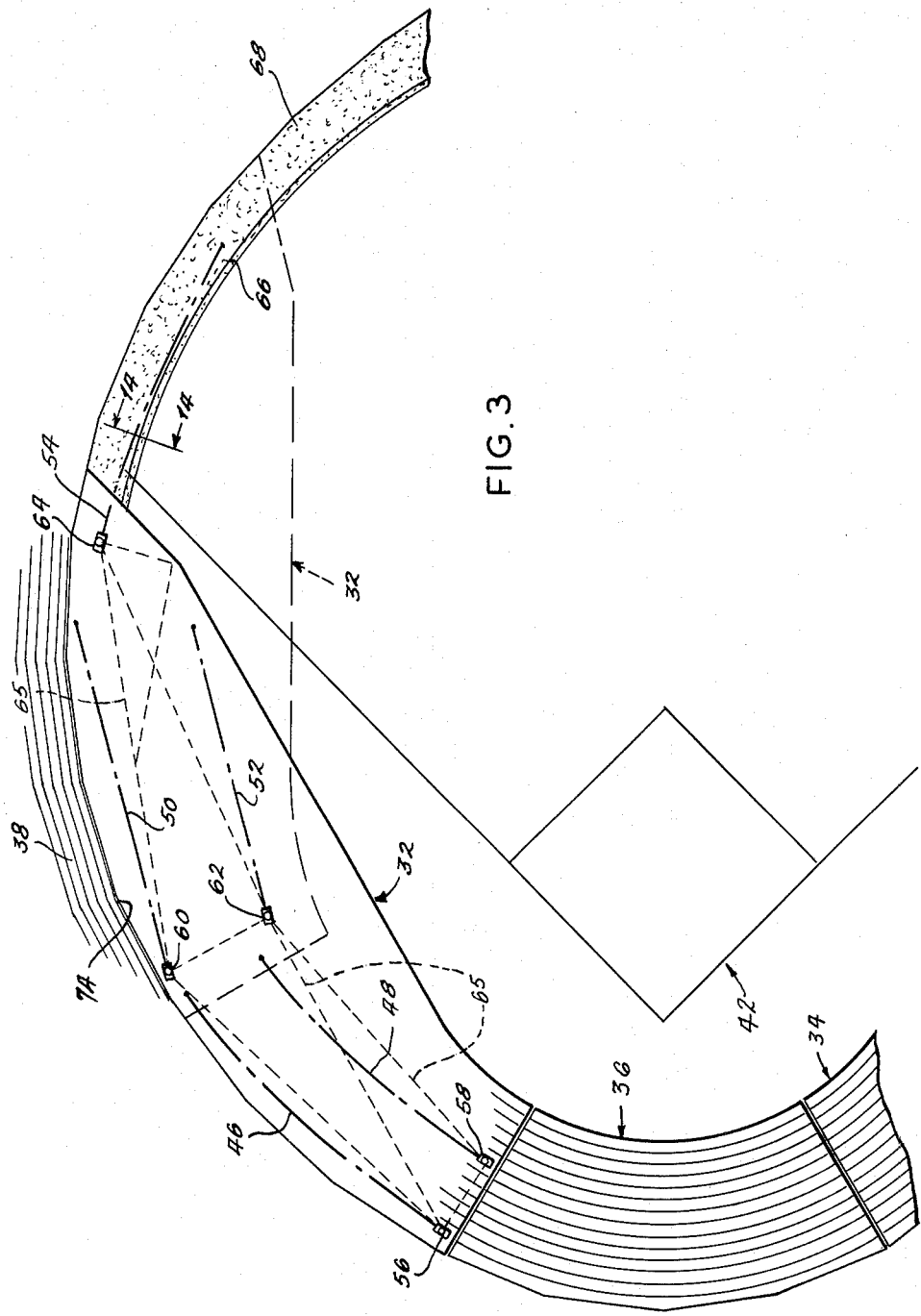

March 22, 1966

O. G. NEWMAN 3,241,270

CONVERTIBLE STADIUM

Filed Dec. 3, 1962

INVENTOR:
OWEN G. NEWMAN

BY Gravely, Lieder & Woodruff
ATTORNEYS.

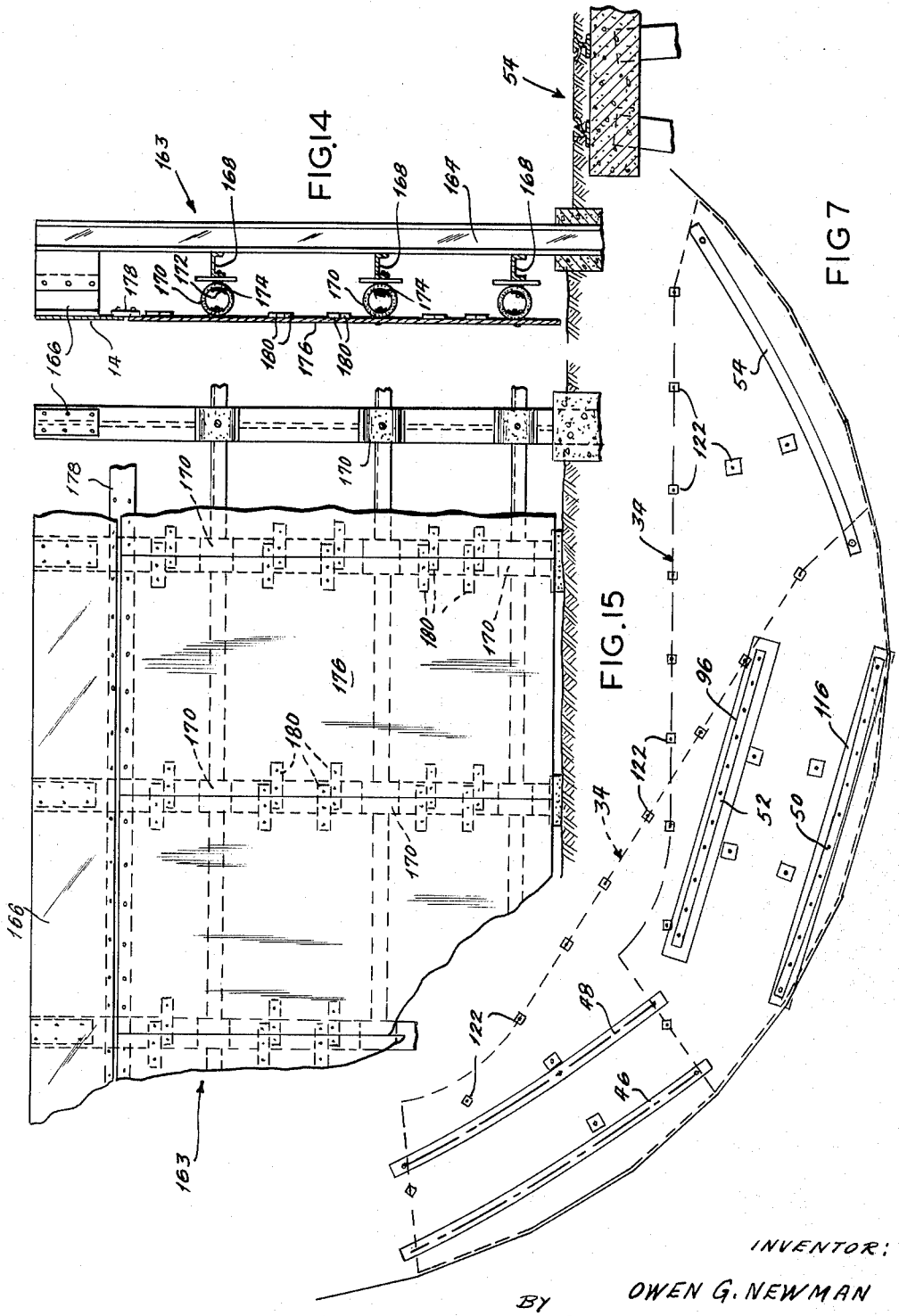

March 22, 1966
O. G. NEWMAN
3,241,270
CONVERTIBLE STADIUM
Filed Dec. 3, 1962
10 Sheets-Sheet 6
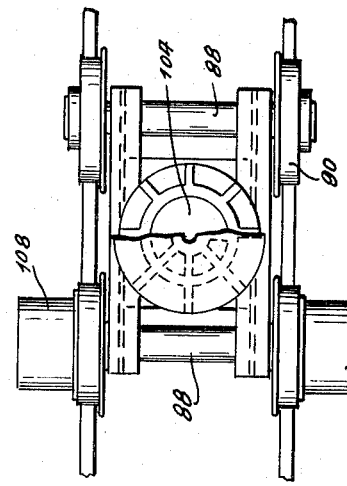
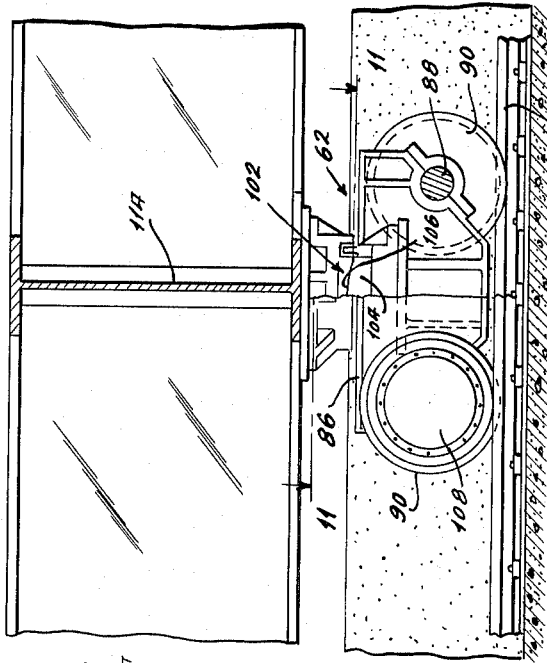
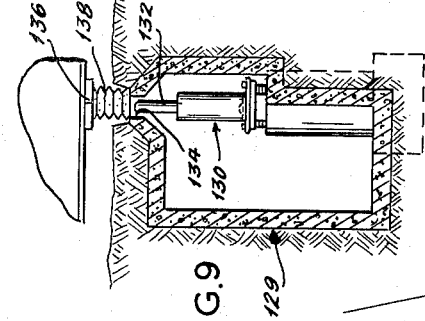
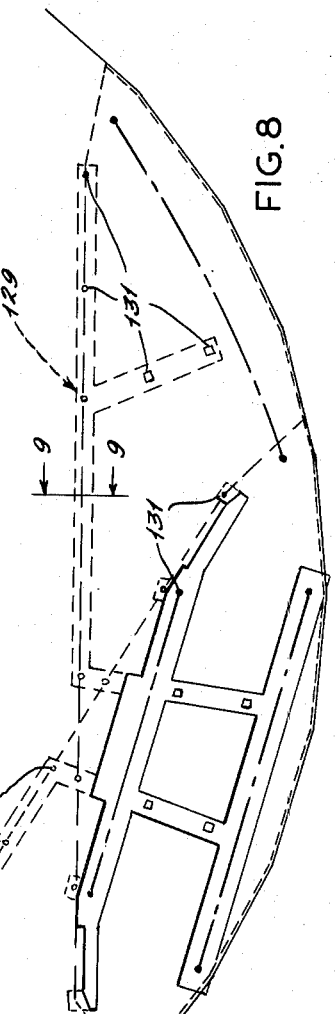
INVENTOR:
OWEN G. NEWMAN
BY Gravely, Lieder & Woodruff
ATTORNEYS.

March 22, 1966   O. G. NEWMAN   3,241,270
CONVERTIBLE STADIUM
Filed Dec. 3, 1962   10 Sheets-Sheet 7
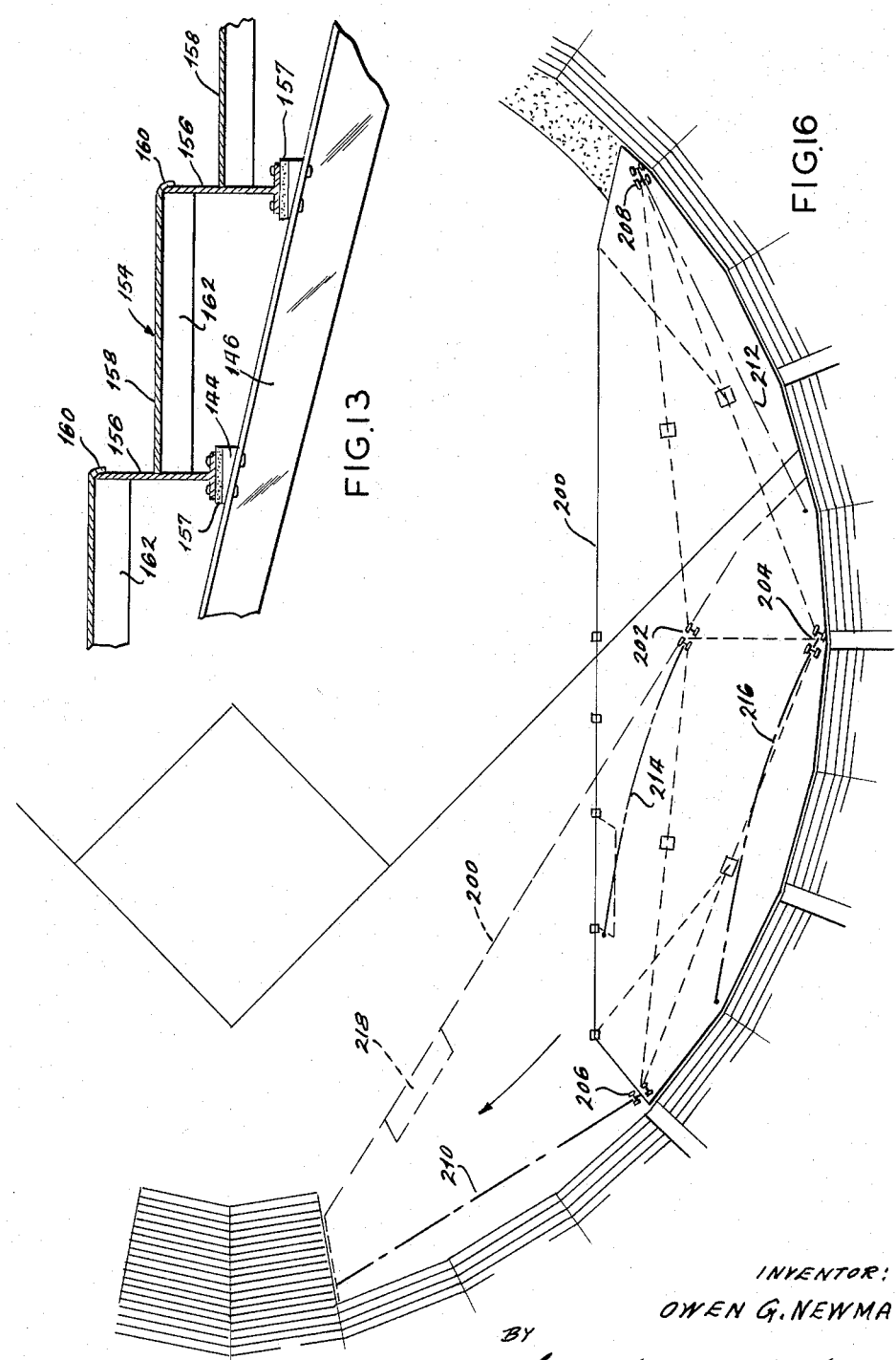
INVENTOR:
OWEN G. NEWMAN
BY
Gravely, Lieder & Woodruff
ATTORNEYS.

March 22, 1966     O. G. NEWMAN     3,241,270
CONVERTIBLE STADIUM
Filed Dec. 3, 1962     10 Sheets-Sheet 8
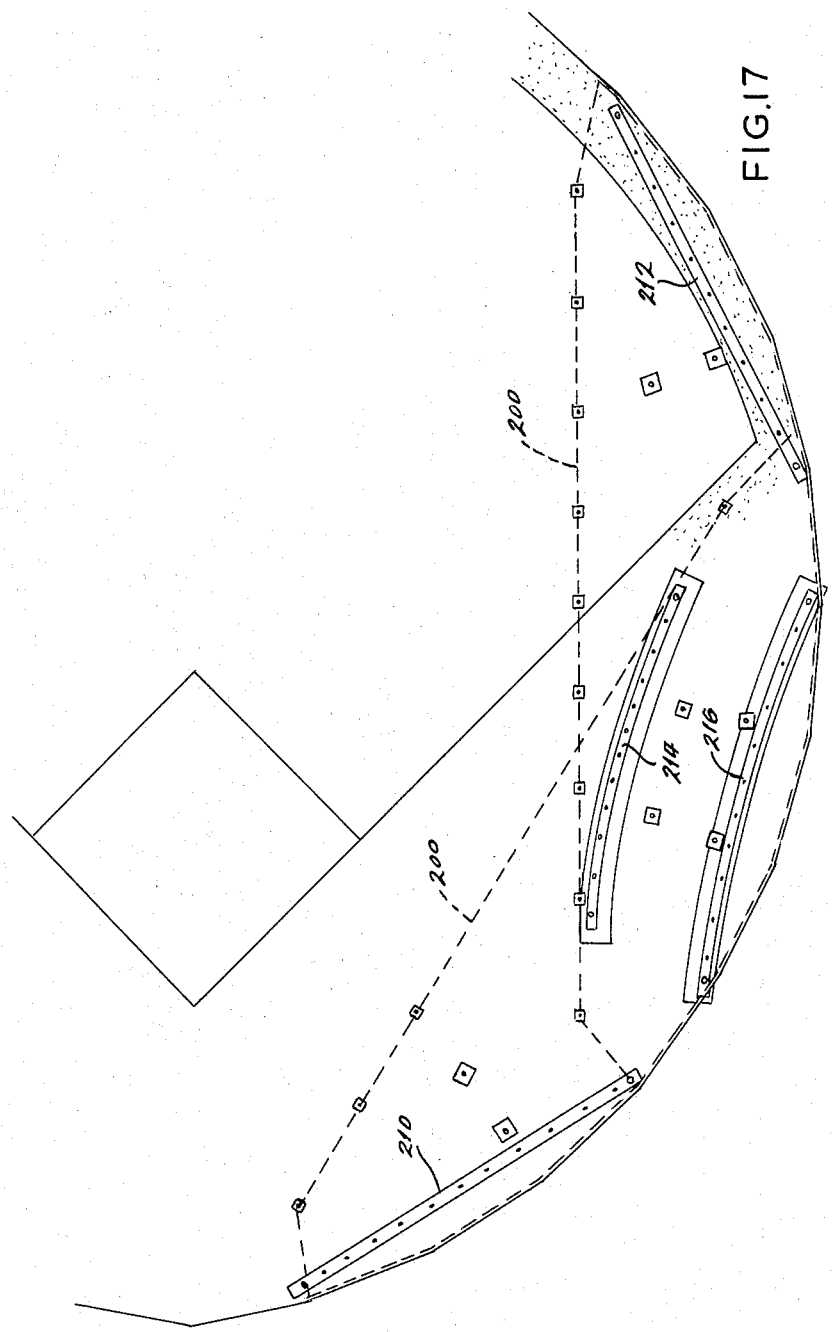
INVENTOR:
OWEN G. NEWMAN
BY Gravely, Lieder & Woodruff
ATTORNEYS

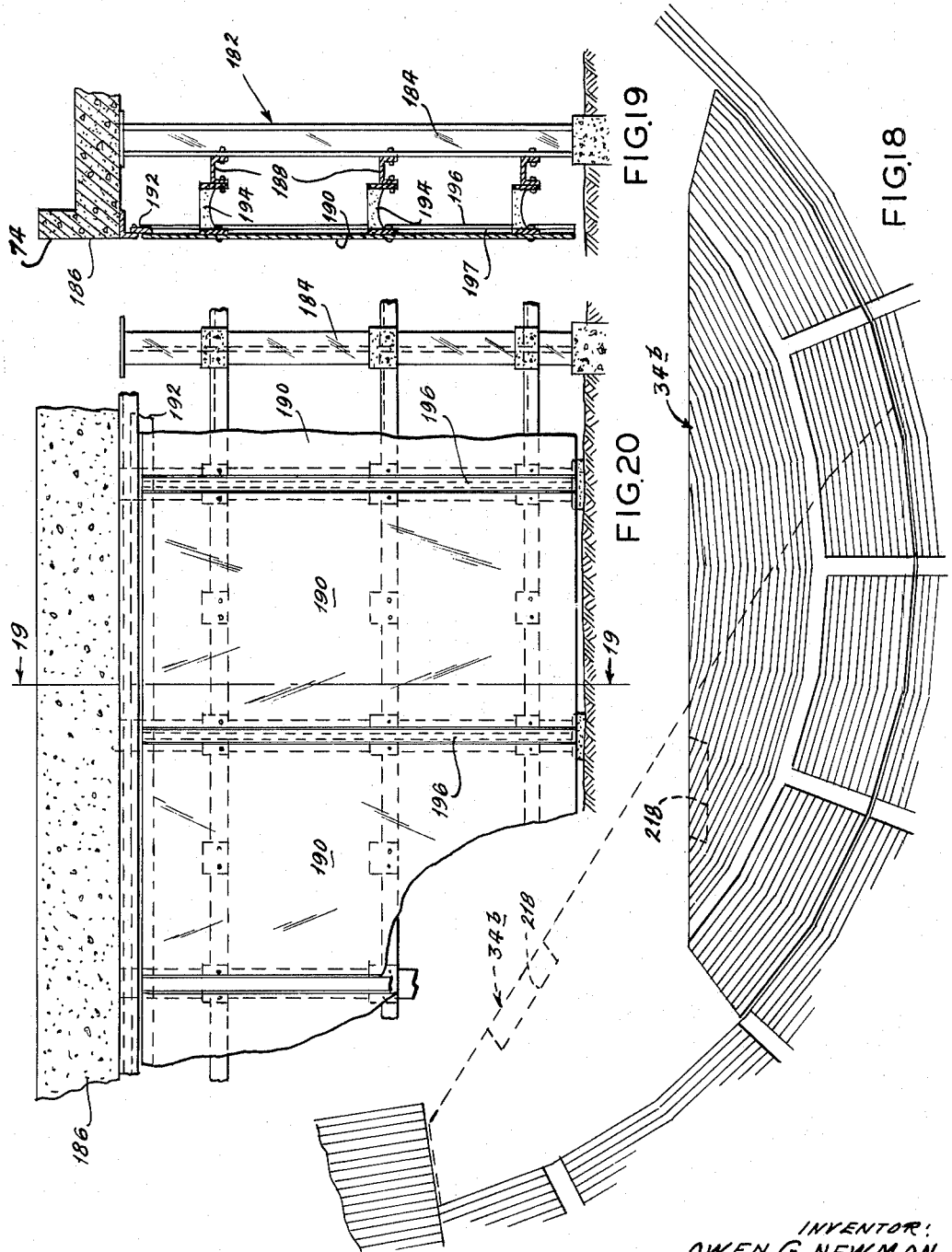

March 22, 1966  O. G. NEWMAN  3,241,270
CONVERTIBLE STADIUM
Filed Dec. 3, 1962  10 Sheets-Sheet 10
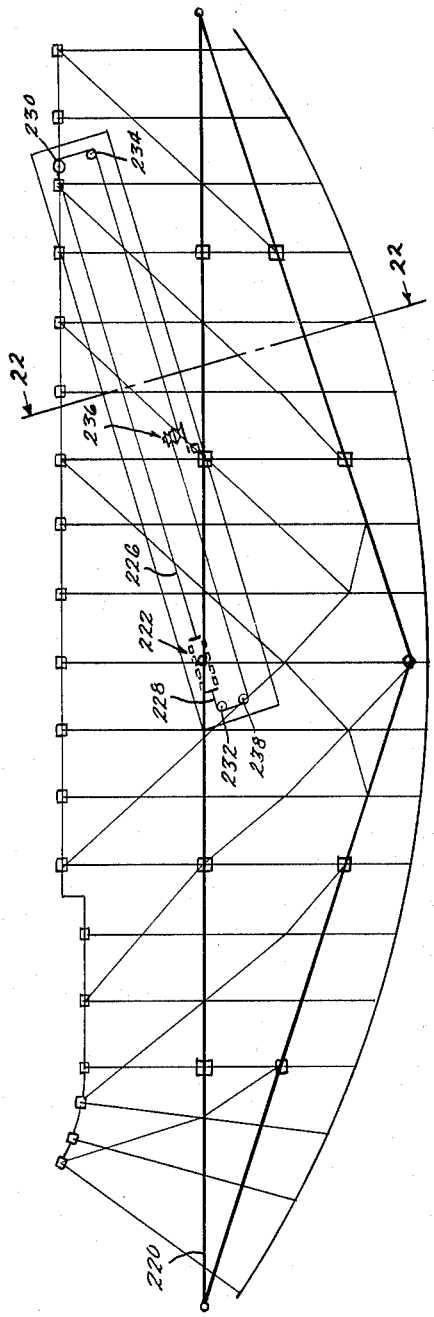
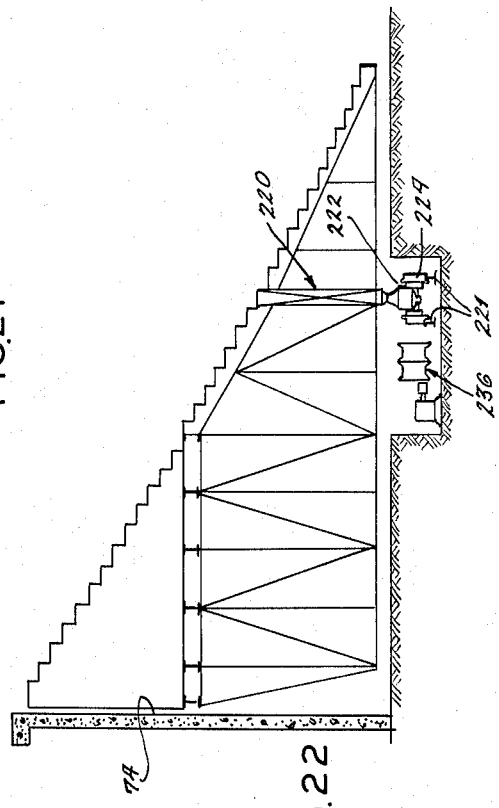
INVENTOR:
OWEN G. NEWMAN
BY
Gravely, Lieder & Woodruff
ATTORNEYS.

United States Patent Office 3,241,270
Patented Mar. 22, 1966

3,241,270
CONVERTIBLE STADIUM
Owen G. Newman, Lemay, Mo., assignor to Sverdrup & Parcel and Associates, Inc., St. Louis, Mo., a corporation of Missouri
Filed Dec. 3, 1962, Ser. No. 242,005
4 Claims. (Cl. 52—9)

The present invention relates generally to stadiums for sports and other events and more particularly to a stadium which is convertible to more than one seating and playing field arrangement to make the stadium provide the best possible accommodation for each different event.

Moving sections of seats and the like to make an auditorium or a stadium better accommodate the spectators and the players at different kinds of events is basically a very old and well known idea. It is also well known that different events such for example, baseball and football require different sizes and shapes of playing areas, and also different spectator seating arrangements for the best possible viewing and comfort of the spectators. It is also true that stadiums located in large metropolitan areas where ground is expensive must be able to handle more than one kind of event to be economically practical. Fortunately, two of our major sports events, namely baseball and football, have substantially non-overlapping seasons and therefore can be accommodated by a single stadium if the seating and the playing field can be conveniently converted. One of the principal difficulties encountered heretofore in attempting to design and construct a stadium that can be for more than one use has been the considerable amount of damage done to the playing field during the conversion. A second major difficulty with known structures has been caused by structural interference between the movable units and the fixed stadium structure during conversions. In large measure this has been due to the inability of known constructions to be able to accommodate normal construction tolerances. Also, the cost to make a conversion, and the time required has been excessive. There are also many technical and engineering problems that must be solved including the problem of maintaining the most desirable size and shape for the playing field. Other problems include the problem of obtaining the best seating arrangement for the maximum number of spectators so that they will have the most advantageous and comfortable view of the activities on the playing field without interfering with the view of spectators in the fixed portion of the stadium, the noise problem, the problem of supporting the seat sections in the various positions and locations, the problem of providing adequate ingress and egress, the problem of player and spectator safety, and the problems and details of designing and constructing mechanism for moving large heavy seat structures quickly and efficiently. No one heretofore has devised a stadium which is readily and quickly convertible for different uses and which at the same time solves all of these and other problems incident thereto.

The present invention teaches the construction of a convertible stadium which in large measure overcomes these and other problems, shortcomings and disadvantages of known constructions. The present stadium comprises a playing field having a pair of movable seating sections positioned adjacent thereto, and means associated with each of said sections for moving said associated section from positions substantially adjacent each other to form a substantially continuous seating section adjacent to the playing field to positions spaced from each other on opposite sides of a playing field having a different shape to accommodate a different event, said moving means being located outside of the playing field itself.

It is a principal object of the present invention to provide a stadium that is readily and quickly convertible for different uses.

Another object is to accommodate a greater number of events in a single stadium.

Another object is to provide a stadium that can be converted for different events in minimum time and with minimum expense.

Another object is to provide means for converting a stadium for different uses without substantially damaging the playing field.

Another object is to provide a pattern of movement for a movable seating section which will tolerate normal or excsssive construction tolerances to such degree that physical interferenecs between the moving sections and the fixed portion of the stadium is eliminated during conversion.

Another object is to provide improved means for supporting and moving large objects such as stadium seating sections and the like.

Another object is to construct a stadium that is relatively safe for the spectators and the players.

Another object is to reduce noise in stadiums and the like.

Another object is to increase the seating capacity of a convertible stadium structure.

Another object is to construct a stadium that provides maximum visual and physical comfort to the spectators.

Another object is to provide a movable outdoor seating section that can be moved to different locations under any weather conditions and any condition of the playing field.

Another object is to provide means for moving a stadium seat section between alternate positions along the shortest possible path and clear of adjacent fixed structures.

Another object is to provide greater flexibility in the selection of power means to move a movable stadium seating structure.

These and other objects and advantages of the present convertible stadium will become apparent after considering the following detailed description of several preferred embodiments in conjunction with the accompanying drawings, wherein:

FIG. 2 is a top plan view of a stadium similar to the stadium of FIG. 1 but having a somewhat different seating arrangement for the movable sections and shown converted to provide the best seating accommodation and playing field arrangement for football and other similar events;

FIG. 3 is an enlarged fragmentary top plan view of a like stadium showing a movable seating section in solid outline in position for baseball and in phantom outline in position for football, said view also showing in dotted outline the paths of movement of the moving support members therefor during a conversion;

FIG. 7 is another top plan view showing the track locations and the locations of other support means for a movable seating section;

FIG. 8 is a view similar to FIG. 7 showing a modified form of support means for the movable seating section;

FIG. 9 is a cross-sectional elevational view taken on line 9—9 of FIG. 8;

FIG. 10 is an enlarged side elevational view of the main movable support means for a movable stadium seating section as seen on line 10—10 of FIG. 6;

FIG. 11 is a cross-sectional view taken on line 11—11 of FIG. 10;

FIG. 12 is an enlarged fragmentary cross-sectional view of a movable seating section taken on line 12—12 of FIG. 1;

FIG. 13 is an enlarged fragmentary cross-sectional view similar to FIG. 12 but taken along an aisle in the movable section;

FIG. 14 is an enlarged cross-sectional view taken on line 14—14 of FIG. 3;

FIG. 15 is a partially cut away fragmentary front view of the outfield wall as seen from the left in FIG. 14;

FIG. 16 is a top plan view similar to FIG. 3 showing a modified form of movable seating section and track arrangement therefor;

FIG. 17 is a fragmentary plan view similar to FIG. 7 but showing modified locations for the tracks along which the movable seating section of FIG. 16 is moved;

FIG. 18 is a top plan view showing another modified form of movable seating section for a convertible stadium;

FIG. 19 is a view similar to FIG. 14 showing a modified form of outfield wall;

FIG. 20 is a front view of the modified outfield wall of FIG. 19 as seen from the left therein;

FIG. 21 is a top plan view showing another modified form of movable stadium seating section and moving means therefor; and FIG. 22 is a cross-sectional view taken on line 22—22 of FIG. 21.

Figure 1:
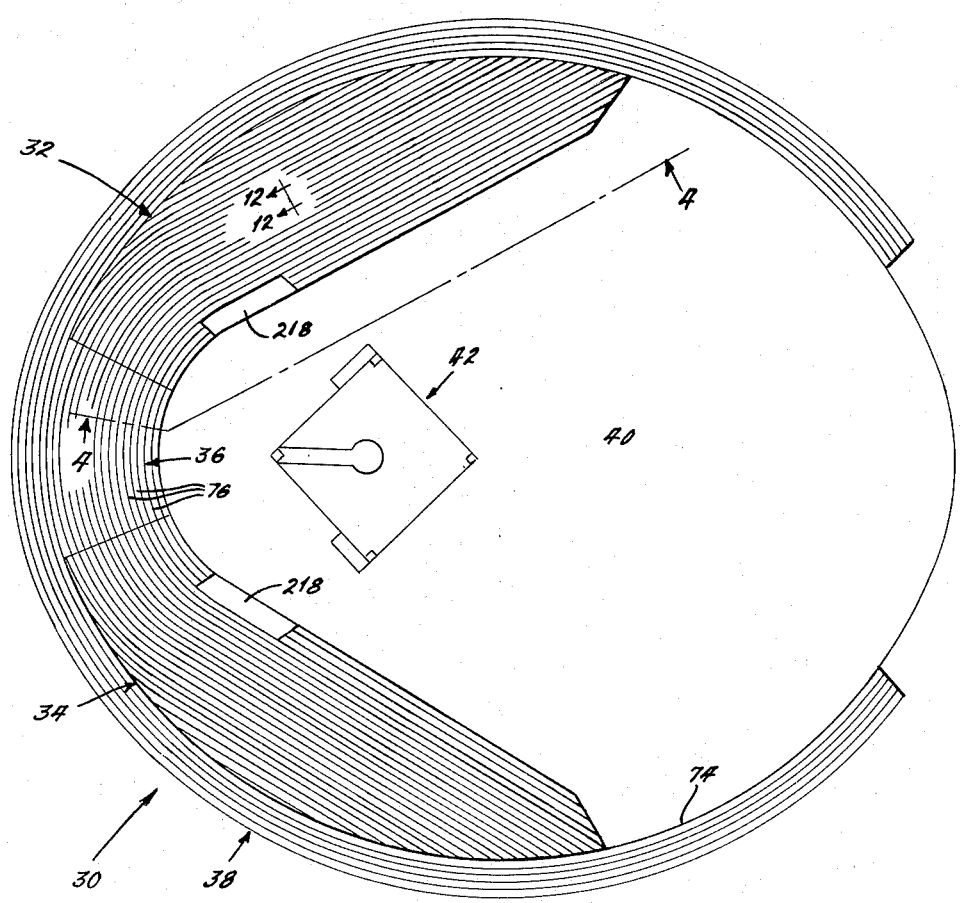
FIG. 1 is a top plan view of a stadium constructed according to the present invention with the seating arranged to best accommodate baseball and other similar events.

Referring to the drawings more particularly by reference numbers, number 30 refers to a stadium constructed according to the present invention. The stadium 30 includes a pair of spaced movable seating sections 32 and 34, two stationary seating sections 36 and 38 and a playing field 40. In FIG. 1 the movable seating sections 32 and 34 are shown positioned to best accommodate a baseball playing field, and in FIG. 2 similar movable sections 32a and 34a are shown in their most desirable locations to accommodate a football playing field. The main difference between the sections 32 and 34 of FIG. 1 and the sections 32a and 34a of FIG. 2 is in the shape of the seat steps on the sections. The baseball diamond is identified generally by number 42 and the football gridiron by number 44. Other intermediate locations of one or both movable sections are also possible, if desired.

Of particular importance to the present invention are the construction and operation of the movable seating sections 32 and 34 and the moving and pattern of movement associated therewith. In order for a convertible stadium to be economically and operationally practical, conversion from one use to another must be accomplished easily and rapidly, with minimum damage to the playing field and with minimum disassembly and reconstruction and without regard to weather or field conditions. So far as known, no one heretofore has been successful in devising a convertible stadium that meets all of these basic requirements.

One reason the present stadium is able to meet these requirements is that it has two movable seating sections instead of one, and each is entirely supported in all of its positions by permanent support means without requiring support from any area of the playing field during its movement. This is important, because it eliminates costly and time consuming repair to the playing field and it also enables the movable sections to be moved with greater speed and accuracy. Secondly, the pattern of movement of the movable sections of the present construction is along the most or nearly the most direct path and is characterized by providing immediate and continuing clearance between the moving sections and the fixed portions of the stadium. Furthermore, the clearance is at or near maximum over much of the travel reaching maximum at mid-movement location and is maintained until the moving sections reach the new locations. This insures satisfactory operation without physical interference and permits more economic construction due to less rigid construction tolerances being required. Several embodiments of the present convertible stadium are shown in the drawings and will be described hereinafter.

FIG. 3 shows two different positions of the movable seating section 32. In the position shown in solid line outline the section 32 is in the most advantageous location for baseball and other similar events and in the phantom outline location the section is positioned for football and the like. FIG. 3 also has long and short dashed lines to indicate the locations of tracks along which wheel assemblies that support the section 32 move during a conversion. For this particular form of the invention, five tracks are employed and are identified by numbers 46, 48, 50, 52 and 54. The tracks 46 and 48 are curved non-circular track sections and accommodate wheel assemblies identified generally by numbers 56 and 58 respectively. The tracks 50 and 52 are straight or nearly straight sections and accommodate wheel assemblies 60 and 62 respectively. Track 54 is also a curved non-circular section and accommodates a wheel assembly 64.

Dotted lines identified generally by number 65 are also included in FIG. 3 and are shown extending between the wheel assemblies 56–64. These lines identify the locations of the main support members or structural members for the seating section. These members 65 are structural members or the like and are large enough and strong enough to support the movable section above ground on the wheel assemblies alone during movement of the section. Since the movable sections will probably be in excess of 100 yards long and nearly 100 feet wide at the center, and since they must also be able to support a considerable number of spectators in their alternate positions, structural members of substantial load carrying capacity will be required.

Referring again to FIG. 3 it will be seen that the section 32 moves between end positions in which it is adjacent to the fixed section 38. In traveling between these positions, the section moves along a path that takes it away from the fixed section 38 reaching its maximum distance therefrom at the center of travel. This can best be understood by noting that the main movable support 62 located near the center of the section, moves on straight track 52, while the movable supports 56, 58 and 64 at the ends of the section 32 move along curved tracks 46, 48 and 54 respectively. This means that the section 32 will pivot while at the same time its center is moving in a straight line. The movement of the section 34 shown in FIG. 7 is similarly reflected in the foregoing description for section 32 shown in FIG. 3. This pattern of movement provides several distinct advantages not previously used. First, in moving away from the fixed wall 74 immediately upon starting and remaining away from it until it is in its new position, interference problems are eliminated. Furthermore, construction tolerance in building the fixed and movable sections and in locating the rails are much less critical. This in turn provides economy in construction. Still further, by placing the heaviest load on a truck that moves on a straight track, the ultimate in operational performance is achieved, and additional economies are obtained. Part of this additional economy is due to a straight track as compared to a curved track. A straight track also has an advantage from the operational standpoint because it reduces to a minimum the distance traveled by the section.

Proper selection of the location of movable support 62 also permits the track on which it is supported to be placed in a trench which will at all times be covered by the movable section. By providing a trench of suitable depth, the pivot assembly on the truck can be located below the main supporting members without weakening them. A trench also provides ready access to the main truck assembly, a particular advantage if the truck is powered by means which may require maintenance. Several power means will be mentioned hereinafter.

In connection with FIG. 3, it will also be noted that the entire length of all of the tracks 46–54 are located outside of the playing field, and therefore can be made as permanent installations with no need to returf or resurface portions of the playing field when the section is moved. This is possible in the present structure because two sections instead of one are moved. Furthermore, since only a relatively small portion of the baseball playing field is covered by the movable section 32 (or 34) when positioned for football, and since the growing season is near or at its end during the football season, and still further since no tracks are located in the covered section of turf, little or no damage to the turf will take place due to being covered during the football season. This in turn reduces field repair and maintenance costs.

In order to construct a convertible stadium that will accommodate professional football and baseball as disclosed herein, the playing field dimensions become such that the normal accepted percentage of home runs desirable from hits over the outfield wall is reduced. It is therefore contemplated to provide a specially constructed outfield wall along the curved area 66 in FIG. 3. This allows better placement of the ball diamond 42 in relation to the seats and also enables a player to hit a more normal proportion of home runs. Besides these advantages, the outfield wall also separates the playing field from a narrow band 68 in which to locate the track 54. This means that the track 54 can be made permanent and left uncovered because it is not in the playing field. It should also be noted that the preferred shape for the stadium 30 is somewhat elliptical or egg shaped rather than round although it is contemplated that it could be made round if desired. The major axis or long dimension of the stadium extends through home plate and second base. The elliptical or egg shape is preferred because it gives a better accommodation for the football gridiron 40. It also extends the center field wall, however, making a wall in the area 66 even more necessary.

However, should the desired spectator capacity of the stadium be such that the desired location of the outfield wall can be made to coincide with the face 74 of the fixed structure, the tracks 54 can be located in a gravel or cinder warning zone ahead of the face of wall 74. These tracks 54 can be laid with the top of the rail a few inches below the level of the playing surface, and covered with the warning zone covering material. Prior to moving the section this material can be quickly and easily removed to expose the rails. This can be done mechanically or manually, by suitable means. Upon moving the seating section back to the baseball position, the material is replaced on the rails. This can be done far less expensively and quicker than the turf could be repaired. The tracks 46 and 48 for trucks 56 and 58 respectively, can be constructed at grade, or at the same elevation as those in the warning strip. The need for covering these tracks will depend upon the use requirement when the seats are in the football position. Since they are not located in the playing field, however, considerations of spectator safety rather than player safety are involved.

Figure 4:
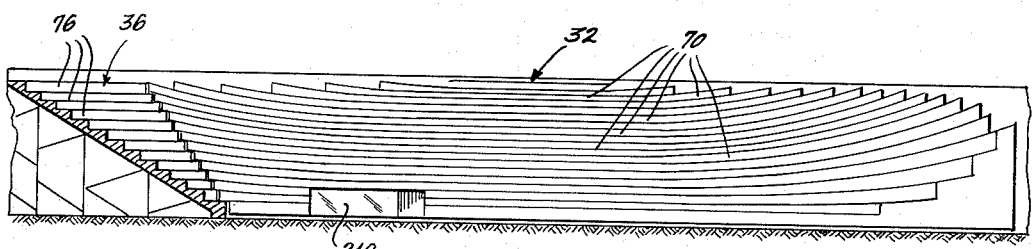
FIG. 4 is a front view of a stadium seating section as seen along line 4—4 in FIG. 1.

FIG. 4 shows a front view of the movable seating section 32 and is of particular interest because it shows a novel arrangement of the steps or risers 70 on which the seats 72 (FIG. 12) are located. The contour and number of steps or risers are shown exaggerated in FIG. 4 to emphasize their shapes. In FIG. 1 and 2 it is clearly shown that the center portions of the movable sections are much wider than the end portions, and consequently have more front to back space for seats. However, the front edge 74 of the permanent seating section 38 and the rear edges of the movable sections 32 and 34 have approximately the same uniform height along their length so as not to interfere with the comfort and visibility of the spectators in section 38. Therefore, to accommodate more rows of seats at the centers of the movable sections than at the ends for the same height, each step must be less high at the center than at the ends. This is clearly shown in FIG. 4. By raising the positions of the spectators at the ends of the rows of the movable sections to the maximum permissible height as determined by the height of the wall face 74 in front of stationary section 38, these spectators are furnished a more advantageous and comfortable view of the entire field without interfering with the normal view and comfort of spectators located elsewhere in the movable and fixed sections. This provision also greatly increases the number of seats in the more desirable locations and therefore also the potential revenue from the stadium. Furthermore, inasmuch as the sections 32 and 34 are relatively long the increasing slope of the seat treads will hardly be noticed when walking lengthwise along the sections. Local codes usually limit the maximum permissible riser height. However, should the slope become uncomfortably steep along the treads, steps can be placed between groups of seats or adjacent to aisles. The seats are arranged on the sections in groups with suitable aisles and vomitories therebetween. For space reasons, however, the seating arrangement and aisles are not shown in the top views of the drawings.

Figure 5:
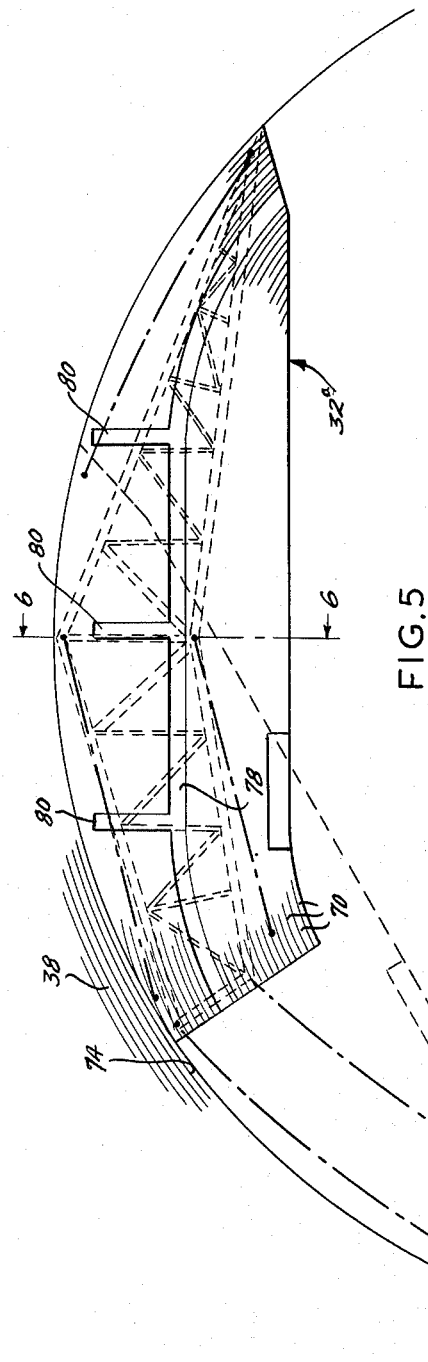
FIG. 5 is an enlarged top plan view showing other details of a movable seating section constructed according to the present invention: said section being shown in an alternate position in dotted outline.

FIG. 5 shows in greater detail the location of the main supporting structures for the movable section 32a, and also the locations of the main walkway 78 and the entrance-exit vomitories 80. A similar walkway 82 and vomitory 84 are also provided on the fixed seating section 36.

Exit provisions from the vomitories on the movable sections are provided in the fixed structure 38 below the seats thereon, and provision is made for ingress and egress through these exits with the movable seats located in any of their predetermined positions.

Figure 6:
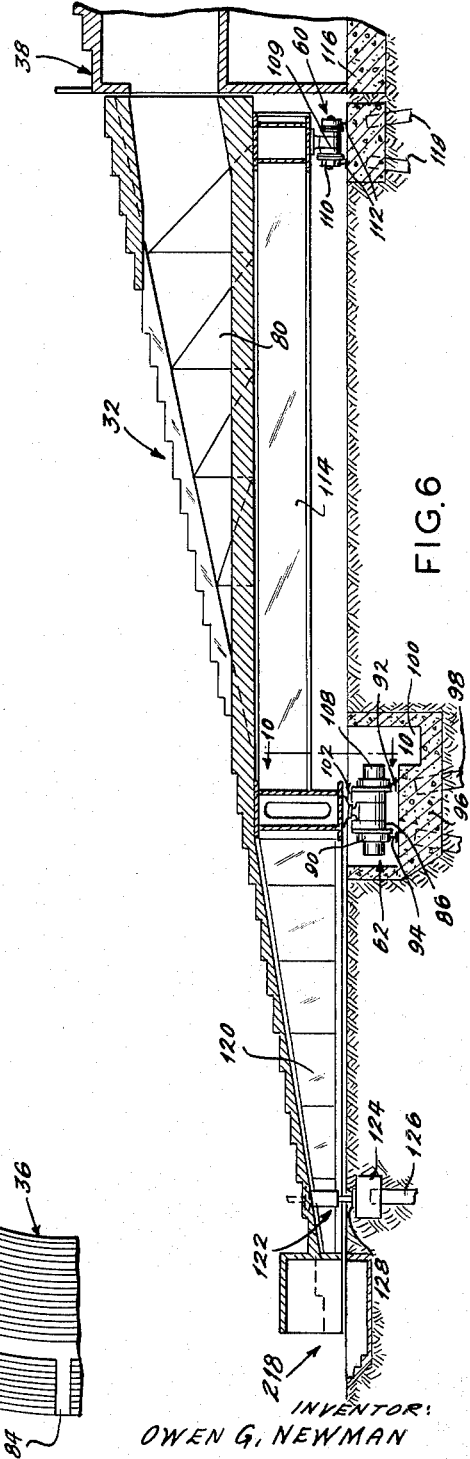
FIG. 6 is a cross-sectional elevational view taken along line 6—6 of FIG. 5.

FIG. 6 shows a cross section of the movable section 32 including one of the vomitories 80. FIG. 6 also shows part of the supporting structure for the section including the two wheel assemblies 60 and 62. The wheel assembly 62 is the main movable support means and framing requirements dictate that it be located more or less centrally under the section 32. The assembly 62 includes a truck assembly 86 with spaced locations for axles 88 on which wheels 90 are located. The wheels 90 are shown as flanged crane or railroad car wheels and they roll on spaced rails 92 and 94 (FIGS. 6 and 10). It is also contemplated that more wheels may be required on the assembly 62 depending upon the weight of the movable sections. The tracks 92 and 94 are supported by a concrete or other base 96 which in turn is supported on an adequate footing. In the particular constructions shown in FIG. 6 a walkway 100 is provided along one side of the rail bed for service and maintenance purposes and also to drain away surface water and the like. The truck assembly 86 (FIGS. 10 and 11) has a rotatable pivot bearing assembly 102 between it and the section 32 which enables the section to turn relative to the truck 86. This is necessary because, as was previously mentioned, the assembly 62 moves in a straight line while the section 32 is turning thereon. The bearing assembly 102 has mating spherical surface segments 104 and 106 to accommodate this turning. Other types of thrust or load carrying pivot connections between the truck and frame can also be used for this purpose.

Two of the wheels 90 are provided with power drive means identified by number 108. The drive means include gear reduction means and motor drive means. Other forms of drive means or mover means can also be used including a power winch or a direct pull or push-device such as a tractor or any other suitable means (see FIG. 21). Means for locking wheel assembly 62 in fixed positions should also be provided to prevent dislocation when loaded with spectators. This can be accomplished with known brakes, chocks, wedges, center pintles or other existing means.

The wheel assembly 60 (FIG. 6) is positioned rearwardly relative to the playing field from the wheel assembly 62 near the rear edge of the section 32. The assembly 60 also has a truck 109 with two pairs of wheels 110 which move on rails 112. The assembly 60 also supports the section on a pivot bearing formed by mating spherical surface segments. The bearings at the assemblies 60 and 62 are connected by a structural member such as by beam 114. The rails 112 that support the wheel assembly 60 are mounted on an adequate footing which may include ties. The rails 112 may be located in a trench similar to the trench 100 provided for rails 92 and 94. These rails are likewise not exposed in any position of the movable section and therefore the trench offers substantially the same advantages as in the case of the assembly 62.

The seating section 32 extends forwardly a considerable distance from the wheel assembly 62 (FIG. 6) and is constructed of suitable connected structural members 120. Jacks 122 are provided at spaced locations along the forward edge and at other locations on the section to provide additional support for the section when it is loaded. When the section is in one of its preselected positions the jacks will be located above fixed ground supports or footings which are shown in FIG. 6 as being blocks 124 supported on piles 126. The upper surfaces of the blocks 124 are below ground level and preferably are provided with bearing plates 128. When the jacks 122 are above the respective plates 128 they are turned down by suitable means to exert predetermined support for the movable seat framework. By providing jacks 122 at spaced locations, as for example at the locations shown in FIG. 7, the section will be adequately supported under fully loaded conditions with the trucks and jacks each taking a predetermined share of the imposed loads. Suitable provisions must also be made at all jack locations to permit the vertical axes of the jacks to tilt slightly to accommodate thermal expansion or contraction in the movable seat section relative to the fixed locations of the jack bearing positions on the footings. During movement of sections 32 and 34 the jacks are retracted and only the pivoted wheel assemblies provide support. Inasmuch as the sections do not normally carry any spectator load during movement, the wheel assemblies need only be capable of supporting the dead weight of the section. The other wheel assemblies at 56, 58 and 64 (FIG. 3) are similar to the wheel assembly 60.

FIGS. 8 and 9 illustrate a modified form of ground support structure for the rails and jacks. In the modified structure a network of underground tunnels 129 with permanent jacks 130 at spaced locations 131 are provided. The jacks are operated from in the tunnels rather than from on top of the seating section as previously described. Suitable support means are provided for the jacks 130, and the operating portion 132 of each jack extends upwardly through a hole 134 in the roof of the tunnel to engage a frame member 136 on the under side of the seating section. Clearances through hole 134 and provisions for slight tilting of the jacks must be provided to accommodate thermal movements. A flexible rain guard or bellows 138 can also be provided if desired to prevent surface water from getting into the tunnels. In the modified construction of FIGS. 8 and 9, as in the structure previously described, tapered potted plugs of turfed soil or plugs of other suitable material (not shown) may be provided to fill the unused ground holes at the jack locations when they are not being used. This facilitates rapid and economical restoration of the field to its normal surface condition.

FIG. 12 is a fragmentary sectional view showing typical steps or risers 70 for the movable sections 32 and 34. The risers 70 include vertical pieces 142 which are attached to structural members 144 supported by beams 146 and treads 148. The treads 148 have rear portions to which seats or chairs 72 are attached, and the forward area may be recessed and filled with a resilient cementitious or other form of sound deadening material 150. Also, for the purpose of reducing the "drum" effect of metal tread panels, inserts 151 of vibration damping material may be inserted between auxiliary members or rods 153 below the floor plate for additional sound deadening effect. The entire undersurface of the treads and risers may also be given an undercoating of thick mastic material. Suitable cross braces 152 are provided at spaced location for strength and rigidity as required. Other forms of risers and seats can also be used, and it is not intended to limit the invention to the particular disclosed form.

FIG. 13 is a sectional view showing the construction of an aisle for between adjacent groups of seats on the sections 32 and 34. In this construction, the risers 156 supporting the tread plates are aligned with risers 70 and are supported by the structural framework members 144. The connections between the seat deck and the supporting frame must be such as to permit movement due to differential thermal and deflection movement. To further deaden and isolate noise, such connections may be mounted on elastic pads 157 which are capable of supporting the imposed loads. Tread pieces 158 with rounded nose portions 160 are attached to the upper edge portions of the vertical pieces 156. The surfaces of the treads 158 are preferably coated with skid resistant material for safety reasons. Stiffeners 162 are also provided for structural reasons. Here again, it is not intended to limit the construction of the aisles to the particular form disclosed, and they may even be substituted for by ramps.

FIGS. 14 and 15 show the structural details of an outfield wall 163 positioned in the narrow strip 66 of FIG. 3. The wall 163 is constructed to be relatively easily assembled and disassembled when the stadium 30 is converted and is also constructed to create a yielding backfield wall and thereby reduce the possibility of injury to a player who runs into it. The wall is constructed of spaced posts 164 mounted in the ground and it is preferable to have the posts positioned in sockets in the ground support means therefor for easy removal. The upper ends of the posts 164 are connected by a rigid member 166, and the posts are also connected by spaced horizontal members 168. Resilient tubular members 170 are connected to the members 168 by bolts 172 and washers 174 as shown in FIG. 14. The opposite sides of the tubular members 170 are connected to wall panels 176 by similar bolts and washers. The panels 176 are in turn connected to the overhead member 166 by flexible members 178, and adjacent panels are positioned in edge-to-edge abutment along the length of the wall 163. In addition the adjacent panels 176 are connected together along their abutting edges by staggered transfer members 180 which transfer impacts between adjacent panels. The members 180 may allow some relative movement between adjacent panels but do not allow excessive movement which might cause pinching. It should now be clear that the outfield wall 163 will yield to some extent when a player runs against it absorbing the impact and preventing to a large extent, disabling bodily injury. However, it will not yield to any substantial degree when struck by an object such as a baseball. Therefore when a baseball strikes the wall it will rebound in the normal expected way.

FIGS. 19 and 20 illustrate a modified form of outfield wall 182, such as would be used where the alignment of the back field wall and the front face 74 of the fixed seating section 38 coincide. The top of the back wall can then be attached to the fixed structure, leaving space as necessary behind the wall to assemble and maintain said wall. The modified wall in most respects is similar to the wall 163 of FIGS. 14 and 15 and includes spaced posts 184, overhead support means 186, and spaced horizontal members 188. The modified wall also has adjacent panels 190, such as plywood panels, which are connected to the overhead support 186 by a flexible strip 192. However, the panels 190 of the modified wall 182 are connected to the members 188 by resilient flexible elastic strut members 194 instead of by tubular members. The flexible elastic struts, acting as columns, buckle under load and absorb the rebound energy, again protecting the player who may crash into the wall from severe bodily injury. Furthermore, adjacent panels 190 in the modified structure are also connected together at their edges by resilient flexible members 196 of H-shaped cross section to cause the adjacent panels to deflect uniformly with an impact in proximity of the vertical splice. The front face of the H-shaped members 196 are preferably flush with the panels 190 and additional pieces 197 are attached to the rear edges of the panels for supporting the members 196. Other modified forms of outfield walls can also be used and are clearly within the scope of the invention.

FIGS. 16 and 17 show a modified form of movable seating section 200, and a modified form of moving means therefor. The modified construction 200 is supported on four spaced wheel assemblies 202, 204, 206 and 208. The end two wheel assemblies 206 and 208, however, unlike the construction previously described, are mounted for movement on straight track sections 210 and 212 respectively instead of on curved track sections, and the center two wheel assemblies 202 and 204 are mounted for movement on curved tracks 214 and 216 respectively. The curved tracks 214 and 216 are of a non-circular shape, the locus of which are determined by the trace of support points 202 and 204 as support points 206 and 208 are moved down their respective straight or approximately straight tracks to their new positions. With this construction, as with the previously described construction, the movable section immediately moves away from the fixed structure, achieving maximum clearance at the midpoint of movement, and then returns to a position adjacent to the fixed wall at the last moment of travel.

FIG. 21 shows another modification whereby the movable section is supported on four wheel assemblies, with the main support or frame member 220 extending substantially the full length of the section and having its upper surface form the seat deck tread for one elevation of seats. This construction provides the maximum possible depth and rigidity for the main frame member. The movable support for the section is centrally located under the main frame members and is movable on a straight track 221.

The modified structure shown in FIGS. 21 and 22 also has a modified form of moving means including a truck assembly 222 supported on wheels 224. The truck is connected at opposite ends by cables 226 and 228 which extend therefrom around pulleys or wheels 230 and 232 respectively, adjacent opposite ends of the straight track 221. The cable 226 extends around a second pulley 234 and then extends around one portion of a drum member 236. The cable 228 in like manner extends around a second pulley 238 and around another portion of the drum 236. The cables 226 and 228 are wound on the drum in reverse manner so that while one cable is winding onto the drum the other cable is unwinding and vice versa. Rotation of the drum in the desired direction will therefore move the truck assembly 222 and the movable seating section in the desired direction. This particular moving means has certain advantages in that it provides both a pulling and a braking action. Other forms of the means for moving the movable sections are also contemplated within the scope of the invention.

Other variations in the shape of the tracks are also possible without departing from the spirit and scope of the invention. The establishment of the loci of movement of one support point together with a predetermined character of movement, or the establishment of the loci of movement of any two support points determines the pattern of movement the movable seat sections will follow. For uniformity of definition it is to be understood that the tracks carrying the major load and controlling the principal direction of movement of the seating sections will be termed primary movement directing track means and the other tracks which cause the seating sections to swing angularly will be termed orientation track means. Thus the track means together determines the pattern of movement needed for the desired end result. The only restriction in establishment of such pattern of movement being the avoidance of interference between the movable and fixed structures. The choice of pattern of movement may be based on provision for clearances, desired track location or alignment relative to the field or to fixed supports, the shape of the movable seat unit or supporting frame, or other pertinent considerations which are expedient from an operational standpoint. It is also possible to have all of the tracks curved in order to move the seating sections along a path wherein the outer edge remains closely adjacent to the permanent seating section therebehind. For the most part, however, it is usually desirable to move the seating sections away from the permanent sections during a conversion for reasons of clearance, construction tolerance, mechanical expediency, time required and distance of travel.

The outer edge of the movable seating sections and the adjacent edges of the permanent section therebehind can be formed of segmental straight or curved sections compatible with the general configuration desirable, with the limitation that the rear of the movable sections mate with the fixed structure in their alternate locations. In general, this restricts the form to that made up of segments of a polygon, the adjacent sides being equal, and the angles between such adjacent sides being equal, these equal angles approaching 180° as the length of the equal sides approach zero. The shape of selected back wall will be dependent upon the physical requirement and constructional limitations imposed by the basic criteria for the stadium.

In another modified construction shown in FIG. 18, the seating arrangement of the movable section 34b has been further modified. In this construction a polygon sectional shape is used and the risers and seating groups are arranged in pie-shaped segments which are wider at the outer edges of the segments than at the inner edges. Here again it can be observed that the center portion of the movable section is wider front to back than the end portions and therefore is able to have more rows of seats. One particular advantage of this type arrangement is that the baseball dugout 218 can be placed at field level in a recess in front of the movable section without providing a depression in the field to enable spectators to see over the top of the dugout. A second feature of the modified construction 34b is that all spectators are seated to face the center of the field, thus giving maximum viewing comfort to the maximum number of spectators for all types of events. In this construction the seat rows can be at the same elevation throughout, or the rows can be sloped along the lines illustrated in FIG. 4. Many other variations of seating are also possible within the scope of the invention.

Thus there has been shown and described several forms and variations of a novel convertible stadium which fulfills all of the objects and advantages sought therefor. Many changes, variations and modifications of the structure will, however, become apparent to those skilled in the art after considering this specification which describes and illustrates several selected forms and variations thereof. All such changes, variations and modifications which

What is claimed is:
1. A convertible stadium comprising:
   (1) a playing field area;
   (2) spectator seating stands spaced from said playing field area;
   (3) a fixed wall defining the front of said seating stands, said fixed wall being generally concave relative to said playing field area;
   (4) a spectator seating section movably disposed in the space between said concave fixed wall and said playing field area, said seating section having a rear wall substantially matching the concave shape of said concave fixed wall in at least two spaced positions of movement of said seating section relative to said concave fixed wall;
   (5) primary movement directing track means in the space between said playing field area and said concave fixed wall, said primary track means having opposite ends substantially equally spaced from said concave fixed wall and having its mid-zone spaced from said fixed wall a distance greater than the end spacing;
   (6) orientation track means in the space between said playing field area and said concave fixed wall, said orientation track means being spaced from said primary track means and having first ends respectively near said opposite ends of said primary track means and second ends remote from said opposite ends of said primary track means, and the respective ends of said orientation track means being substantially equally spaced from said concave fixed wall and having the mid-zone thereof spaced from said fixed wall to a greater distance than said ends; and
   (7) wheeled truck means pivotally connected to said seating section, and including:
      (a) first truck means engaged on said primary track means for direction thereby to guide said seating section to break away from and return to said two spaced positions in which said concave fixed wall and said rear wall are respectively closely adjacent, said first truck means upon seating section movement maintaining said seating section rear wall spaced from said concave fixed wall,
      (b) and other truck means engaged on said orientation track means for guidance thereby to angularly orient said seating section rear wall with said concave fixed wall between said two spaced positions of movement of said seating section.

2. The convertible stadium set forth in claim 1 wherein said primary track means is substantially straight and said orientation track means are curved.

3. A convertible stadium comprising:
   (1) a playing field;
   (2) a fixed spectator seating stand spaced from said playing field;
   (3) a fixed wall defining a boundary for said playing field and forming the front of said fixed stand, said fixed wall being generally concave relative to the playing field side thereof;
   (4) a movable spectator seating section in said space between said playing field and said fixed wall and having a rear wall substantially matching the concave fixed wall and which is normally closely adjacent thereto;
   (5) and means guiding movement of said movable seating section between first and second positions in front of different portions of said seating stand, including:
      (a) first track means adjacent said first position defining a first path of movement for angularly swinging said seating section, said first track means having opposite ends substantially at the same distances from said fixed wall and its midzone at a greater distance than its opposite ends to guide said seating section into and out of said adjacency with said fixed wall,
      (b) second track means adjacent said second position defining a second path of movement for angularly swinging said seating section, said second track means having opposite ends substantially at the same distance from said fixed wall and its mid-zone at a greater distance than its opposite ends to guide said seating section into and out of said adjacency with said fixed wall,
      (c) said first and second track means being generally angularly directed relative to each other and non-concentric relative to said concave fixed wall,
      (d) third track means defining a path of movement geometrically dependent on and directionally different from the paths of movement defined by said first and second track means which guides translatory movement of said seating section between said first and second positions, said third track means having opposite ends at substantially equal distances from said concave fixed wall and its mid-zone at a greater distance than its opposite ends,
      (e) a plurality of wheeled means pivotally connected to said seating section and engaging said track means,
      (f) certain of said wheeled means engaging said third track means for stabilizing said seating section upon movement of said seating section relative to said concave fixed wall,
      (g) and certain others of said wheeled means engaging said first and second track means to control the angular swinging of said seating section relative to said concave fixed wall in moving between said first and second positions.

4. The convertible stadium set forth in claim 3 wherein said first and second track means are substantially straight and said third stack means is curved.

References Cited by the Examiner
UNITED STATES PATENTS

| | | | |
|---|---|---|---|
| 1,433,547 | 10/1922 | Hadden | 52—9 |
| 2,505,902 | 5/1950 | Madger | 52—497 |
| 2,587,159 | 2/1952 | Holmes | 52—9 |
| 2,594,928 | 4/1952 | Horowitz | 52—284 |
| 2,968,841 | 1/1961 | Vance | 52—10 |
| 3,002,234 | 10/1961 | Waterbury | 52—9 |
| 3,052,929 | 9/1962 | Busse | 52—10 |
| 3,069,732 | 12/1962 | Murphy | 52—10 |
| 3,168,761 | 2/1965 | Graf | 52—9 |

FOREIGN PATENTS

| | | |
|---|---|---|
| 1,143,873 | 4/1957 | France. |
| 804,129 | 4/1851 | Germany. |

FRANK L. ABBOTT, *Primary Examiner.*

EARL J. WITMER, *Examiner.*

R. A. STENZEL, *Assistant Examiner.*